(12) United States Patent
Vasseur et al.

(10) Patent No.: US 9,718,309 B2
(45) Date of Patent: Aug. 1, 2017

(54) TIRE COMPRISING A COMPOSITION COMPRISING A ZINC DIACRYLATE DERIVATIVE AND A PEROXIDE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Didier Vasseur, Clermont-Ferrand (FR); Aurore Crochet, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 15/025,905

(22) PCT Filed: Oct. 22, 2014

(86) PCT No.: PCT/EP2014/072602
§ 371 (c)(1),
(2) Date: Mar. 30, 2016

(87) PCT Pub. No.: WO2015/059167
PCT Pub. Date: Apr. 30, 2015

(65) Prior Publication Data
US 2016/0243896 A1 Aug. 25, 2016

(30) Foreign Application Priority Data
Oct. 22, 2013 (FR) ...................... 13 60286

(51) Int. Cl.
| | | |
|---|---|---|
| *C08K 5/09* | (2006.01) | |
| *B60C 1/00* | (2006.01) | |
| *C08K 5/098* | (2006.01) | |
| *B60C 11/00* | (2006.01) | |
| *C08K 3/04* | (2006.01) | |
| *C08K 5/14* | (2006.01) | |

(52) U.S. Cl.
CPC ........ *B60C 1/0016* (2013.01); *B60C 11/0008* (2013.04); *C08K 3/04* (2013.01); *C08K 5/098* (2013.01); *C08K 5/14* (2013.01); *B60C 2011/0025* (2013.04)

(58) Field of Classification Search
CPC .............. B60C 1/0016; B60C 11/0008; B60C 2011/0025; C08K 5/098; C08K 5/14
USPC ...................................................... 524/381
See application file for complete search history.

(56) References Cited

U.S. PATENT DOCUMENTS

| | | | |
|---|---|---|---|
| 5,227,425 A | 7/1993 | Rauline | 524/493 |
| 5,852,099 A | 12/1998 | Vanel | 524/494 |
| 5,900,449 A | 5/1999 | Custodero et al. | 524/430 |
| 5,977,238 A | 11/1999 | Labauze | 524/492 |
| 6,013,718 A | 1/2000 | Cabioch et al. | 524/506 |
| 6,397,913 B1 * | 6/2002 | Kanenari | B60C 1/00 152/517 |
| 6,420,488 B1 | 7/2002 | Penot | 525/332.7 |
| 6,503,973 B2 | 1/2003 | Robert et al. | 524/492 |
| 6,536,492 B2 | 3/2003 | Vasseur | 152/450 |
| 6,774,255 B1 | 8/2004 | Tardivat et al. | 556/427 |
| 6,815,473 B2 | 11/2004 | Robert et al. | 523/215 |
| 7,250,463 B2 | 7/2007 | Durel et al. | 524/492 |
| 7,300,970 B2 | 11/2007 | Durel et al. | 524/493 |
| 7,312,264 B2 | 12/2007 | Gandon-Pain | 524/236 |
| 7,335,692 B2 | 2/2008 | Vasseur et al. | 524/312 |
| 7,448,425 B2 | 11/2008 | Vasseur | 156/516 |
| 7,488,768 B2 | 2/2009 | Tardivat et al. | 524/262 |
| 7,491,767 B2 | 2/2009 | Durel et al. | 524/493 |
| 7,820,771 B2 | 10/2010 | Lapra et al. | 525/479 |
| 8,080,603 B2 | 12/2011 | Bergman | 524/396 |
| 8,344,063 B2 | 1/2013 | Marechal et al. | 524/571 |

(Continued)

FOREIGN PATENT DOCUMENTS

| | | |
|---|---|---|
| EP | 0 390 012 A1 | 10/1990 |
| EP | 0 501 227 A1 | 9/1992 |

(Continued)

OTHER PUBLICATIONS

International Search Report dated Jan. 13, 2015, issued by EPO in connection with International Application No. PCT/EP2014/072602.

*Primary Examiner* — Hui Chin
(74) *Attorney, Agent, or Firm* — Fitzpatrick, Cella, Harper & Scinto

(57) ABSTRACT

The invention relates to a tire provided with a tread, said tread comprising a rubber composition based on at least one diene elastomer, a zinc diacrylate derivative in the form of a zinc salt in which R1, R2 and R3 independently represent a hydrogen atom or a C1-C7 hydrocarbon group selected from linear, branched or cyclic alkyl groups, aralkyl groups, alkylaryl groups and aryl groups, which are optionally interrupted by one or more heteroatoms, R2 and R3 being able to form together a non-aromatic ring, and a peroxide. The contents of zinc diacrylate derivative and peroxide are such that the ratio of the peroxide content to the zinc diacrylate derivative content is less than or equal to 0.09, said composition comprising no reinforcing filler or comprising less than 50 phr thereof, the ratio of the filler content to the zinc diacrylate derivative content being less than or equal to 2.

29 Claims, No Drawings

(56) References Cited

U.S. PATENT DOCUMENTS

| | | |
|---|---|---|
| 8,455,584 B2 | 6/2013 | Robert et al. ............... 524/505 |
| 8,461,269 B2 | 6/2013 | Varagniat et al. ........... 525/209 |
| 8,492,475 B2 | 7/2013 | Araujo Da Silva et al. . 524/552 |
| 8,883,929 B2 | 11/2014 | Gandon-Pain et al. ... 525/326.5 |
| 2001/0034389 A1 | 10/2001 | Vasseur ........................ 524/137 |
| 2001/0036991 A1 | 11/2001 | Robert et al. ............... 524/492 |
| 2002/0183436 A1 | 12/2002 | Robert et al. ............... 524/492 |
| 2003/0065076 A1 | 4/2003 | Hellens et al. .............. 524/397 |
| 2004/0051210 A1 | 3/2004 | Tardivat et al. ............. 264/349 |
| 2004/0127617 A1 | 7/2004 | Vasseur et al. .............. 524/318 |
| 2005/0004297 A1 | 1/2005 | Durel et al. ................. 524/493 |
| 2005/0016650 A1 | 1/2005 | Durel et al. ............... 152/209.1 |
| 2005/0016651 A1 | 1/2005 | Durel et al. ............... 152/209.1 |
| 2005/0049344 A1 | 3/2005 | Vasseur ........................ 524/394 |
| 2005/0084638 A1 | 4/2005 | Kerstetter, III et al. ...... 428/36.1 |
| 2006/0089445 A1 | 4/2006 | Gandon-Pain ................ 524/492 |
| 2008/0132644 A1 | 6/2008 | Lapra et al. ................. 525/105 |
| 2009/0186961 A1 | 7/2009 | Araujo Da Silva et al. . 523/150 |
| 2009/0215552 A1* | 8/2009 | Okamoto ........... A63B 37/0003 473/351 |
| 2009/0234066 A1 | 9/2009 | Araujo Da Silva et al. . 524/571 |
| 2009/0270558 A1 | 10/2009 | Gandon-Pain et al. ...... 525/190 |
| 2010/0022714 A1 | 1/2010 | Varagniat et al. ........... 525/209 |
| 2010/0056686 A1 | 3/2010 | Bergman ..................... 524/396 |
| 2010/0184912 A1 | 7/2010 | Marechal et al. ........... 524/571 |
| 2010/0249270 A1 | 9/2010 | Robert et al. ............... 523/150 |
| 2010/0252156 A1 | 10/2010 | Robert et al. ............. 152/209.1 |
| 2011/0021702 A1 | 1/2011 | Gandon-Pain et al. ........ 525/55 |
| 2011/0152458 A1 | 6/2011 | Araujo Da Silva et al. . 525/102 |
| 2012/0208948 A1 | 8/2012 | Gandon-Pain et al. ...... 524/521 |
| 2012/0252928 A1 | 10/2012 | Marechal et al. ........... 523/155 |
| 2015/0231925 A1* | 8/2015 | Custodero ............ B60C 1/0016 152/209.1 |

FOREIGN PATENT DOCUMENTS

| | | |
|---|---|---|
| EP | 0 735 088 A1 | 10/1996 |
| EP | 0 810 258 A1 | 12/1997 |
| EP | 1 127 909 A1 | 8/2001 |
| FR | 2 740 778 A1 | 5/1997 |
| FR | 2 765 882 A1 | 1/1999 |
| WO | 97/36724 A2 | 10/1997 |
| WO | 99/16600 A1 | 4/1999 |
| WO | 00/05300 A1 | 2/2000 |
| WO | 00/05301 A1 | 2/2000 |
| WO | 01/92402 A1 | 12/2001 |
| WO | 02/30939 A1 | 4/2002 |
| WO | 02/31041 A1 | 4/2002 |
| WO | 02/088238 A1 | 11/2002 |
| WO | 03/002648 A1 | 1/2003 |
| WO | 03/002649 A1 | 1/2003 |
| WO | 03/016387 A1 | 2/2003 |
| WO | 03/066352 A1 | 8/2003 |
| WO | 2004/096865 A2 | 11/2004 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2008/079107 A1 | 7/2008 |
| WO | 2008/141702 A1 | 11/2008 |
| WO | 2009/000750 A1 | 12/2008 |
| WO | 2009/000752 A1 | 12/2008 |
| WO | 2011/042507 A1 | 4/2011 |

* cited by examiner

TIRE COMPRISING A COMPOSITION COMPRISING A ZINC DIACRYLATE DERIVATIVE AND A PEROXIDE

FIELD OF THE INVENTION

The invention relates to tyres and more particularly to those for which the composition of the tread comprises a zinc diacrylate derivative and a peroxide.

RELATED ART

Such compositions are described in certain background art documents, for subjects that are not tyre treads. For example, document US 2003/0065076 describes compositions for military tank tracks, comprising an elastomer, a reinforcing filler, zinc diacrylate or zinc dimethacrylate, and a peroxide, having the effect of improving the abrasion resistance. In this document, the ratio between the contents of peroxide on the one hand and of zinc diacrylate or of zinc dimethacrylate on the other hand has a value of 0.1; 0.12 or 0.15 according to the examples.

Likewise, document US 2005/0084638 describes compositions of mixtures for covering an air sleeve for suspension systems, also comprising an elastomer, a reinforcing filler, zinc diacrylate and a peroxide. In this document, the ratio between the contents of peroxide and of zinc diacrylate has a value of 0.15 or 0.2 according to the examples.

In the specific field of tyres and more particularly of their treads, since fuel savings and the need to protect the environment have become a priority, it has proved necessary to produce tyres having a reduced rolling resistance, without adversely affecting the other properties of the tyre, this constraint being particularly high for tyre treads. The manufacturers have developed tyre compositions that make it possible to reduce this rolling resistance in various ways and in particular by introducing silica into the mixtures as reinforcing filler.

Nevertheless, the manufacturers still seek solutions for further lowering the rolling resistance of the tyre treads and it is within this context that the applicant companies have surprisingly discovered that the hysteresis could be significantly reduced in tyre rubber compositions, with a reduced content of reinforcing filler, the composition comprising a zinc diacrylate derivative and a peroxide, on the condition that a suitable ratio between the peroxide content and the zinc diacrylate derivative content is adopted.

Furthermore, this solution has many other advantages with respect to the background art compositions and in particular an improved aging resistance under thermal and thermal-oxidative conditions.

BRIEF DESCRIPTION OF EMBODIMENTS OF THE INVENTION

The invention therefore relates to a tyre provided with a tread comprising a rubber composition based on at least one diene elastomer, a zinc diacrylate derivative in the form of a zinc salt of formula (I)

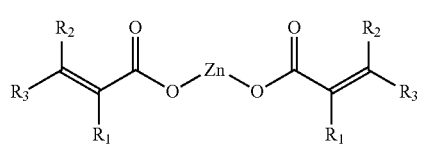

in which $R_1$, $R_2$ and $R_3$ independently represent a hydrogen atom or a C1-C7 hydrocarbon group selected from linear, branched or cyclic alkyl groups, aralkyl groups, alkylaryl groups and aryl groups, which are optionally interrupted by one or more heteroatoms, $R_2$ and $R_3$ being able to form together a non-aromatic ring, said composition additionally comprising a peroxide, the contents of zinc diacrylate derivative and of peroxide being such that the ratio of the peroxide content to the zinc diacrylate derivative content is less than or equal to 0.09, said composition comprising no reinforcing filler or comprising less than 50 phr thereof, the ratio of the filler content to the zinc diacrylate derivative content being less than or equal to 2.

Preferably, the invention relates to a tyre as defined above wherein $R_1$, $R_2$ and $R_3$ independently represent a hydrogen atom or a methyl group. More preferably, $R_2$ and $R_3$ each represent a hydrogen atom. More preferably also, $R_1$ represents a methyl group.

Preferably, the invention relates to a tyre as defined above wherein the amount of zinc diacrylate derivative in the composition is within a range extending from 10 to 50 phr (parts by weight per hundred parts by weight of elastomer), preferably from 20 to 30 phr.

Preferably, the invention relates to a tyre as defined above wherein the peroxide in the composition is an organic peroxide, preferably present in an amount of less than or equal to 3 phr. More preferably, the amount of peroxide in the composition is within a range extending from 0.1 to 3 phr; more preferably from 0.2 to 2 phr, and more preferably still from 0.25 to 1 phr.

Preferably, the invention relates to a tyre as defined above wherein the ratio of the peroxide content to the zinc diacrylate derivative content is less than or equal to 0.05, preferably less than or equal to 0.04 and more preferably less than or equal to 0.02.

Preferably, the invention relates to a tyre as defined above wherein the diene elastomer is selected from the group consisting of polybutadienes, synthetic polyisoprenes, natural rubber, butadiene copolymers, isoprene copolymers and mixtures of these elastomers. More preferably, the diene elastomer is selected from the group consisting of polybutadienes, synthetic polyisoprenes, natural rubber, copolymers of butadiene and styrene, copolymers of butadiene and acrylonitrile, copolymers of isoprene and styrene and mixtures of these elastomers.

Preferably, the invention relates to a tyre as defined above wherein the content of reinforcing filler is within a range extending from 5 to 45 phr; more preferably from 10 to 40 phr, better still from 15 to 35 phr.

Preferably, the invention relates to a tyre as defined above wherein the reinforcing filler is carbon black, silica or a mixture of the latter. Preferably, the reinforcing filler predominantly consists of carbon black.

Preferably, the invention relates to a tyre as defined above wherein the ratio of the filler content to the zinc diacrylate derivative content is within a range extending from 0.3 to 2, preferably from 0.7 to 1.3.

Preferably, the invention relates to a tyre as defined above wherein the composition contains no molecular sulphur or sulphur donor as vulcanizing agent or contains less than 0.5 phr thereof. Preferably, the composition contains no molecular sulphur or sulphur donor as vulcanizing agent or contains less than 0.3 phr and preferably less than 0.1 phr thereof. Preferably, the composition contains no vulcanization accelerator.

Preferably, the invention relates to a tyre as defined above wherein the composition contains no antioxidant.

Preferably also, the invention relates to a tyre as defined above in which the composition additionally comprises a plasticizer, preferably selected from plasticizing resins, extender oils and mixtures thereof.

Preferably, the tyre according to the invention will be selected from the tyres intended to equip a two-wheel vehicle, a passenger vehicle, or else a heavy-duty vehicle (i.e. underground train, bus, off-road vehicles and heavy road transport vehicles, such as lorries, towing vehicles, trailers), or else aircraft, or civil engineering, agricultural or handling vehicles.

DETAILED DESCRIPTION OF THE INVENTION

I—Constituents of the Composition of the Tread

The rubber composition of the tread of the tyre according to the invention is based on the following constituents: a zinc diacrylate derivative in the form of a zinc salt of formula (I) and a peroxide, the contents of zinc diacrylate derivative and of peroxide being such that the ratio of the peroxide content to the zinc diacrylate derivative content is less than or equal to 0.09, said composition comprising no reinforcing filler or comprising less than 50 phr thereof, the ratio of the filler content to the zinc diacrylate derivative content being less than or equal to 2.

In the present application, the expression "phr" means, in a known manner, parts by weight per hundred parts by weight of elastomer. The amount by weight of the constituents of the compositions is thus expressed relative to the total amount of elastomers by weight which is considered by convention to be the value one hundred.

The expression "composition based on" should be understood to mean a composition comprising the mixture and/or the in situ reaction product of the various base constituents used, some of these constituents being able to react and/or being intended to react with one another, at least partially, during the various phases of manufacture of the composition, or during the subsequent curing, modifying the composition as it is prepared at the start. Thus, the compositions as used for the invention may be different in the uncrosslinked state and in the crosslinked state.

In the present description, unless expressly indicated otherwise, all the percentages (%) shown are percentages by weight. Moreover, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

Within the meaning of the present invention and in a manner known to a person skilled in the art, a tread is understood to mean the layer of the tyre which is in contact with the running surface. Indeed, it is possible to define within the tyre three types of zones:

The internal zone of the tyre, that is to say the zone between the outer and inner zones. This zone includes layers or plies which are referred to here as internal layers of the tyre. These are for example carcass plies, tread sublayers, belt plies of tyres or any other layer which is not in contact with the ambient air or the inflation gas of the tyre.

The radially inner zone that is in contact with the inflation gas, this zone generally consisting of the layer that is airtight to the inflation gases, sometimes referred to as the inner liner.

The radially outer zone that is in contact with the ambient air, this zone essentially consisting of the tread and the outer sidewall of the tyre. The tyre tread is positioned radially on top of the tyre belt and therefore forms the layer in contact with the running surface.

I-1 Diene Elastomer

The tread compositions of the tyre of the invention may contain a single diene elastomer or a mixture of several diene elastomers.

It is recalled here that an elastomer (or "rubber", the two terms being considered to be synonymous) of "diene" type should be understood, in a known manner, to mean an (one or more is understood) elastomer resulting at least partly (i.e. a homopolymer or a copolymer) from diene monomers (monomers bearing two conjugated or unconjugated carbon-carbon double bonds).

Diene elastomers can be classified into two categories: "essentially unsaturated" or "essentially saturated". The expression "essentially unsaturated" is generally understood to mean a diene elastomer resulting at least partly from conjugated diene monomers, having a content of units of diene origin (conjugated dienes) that is greater than 15% (mol %). Thus, diene elastomers such as butyl rubbers or diene/α-olefin copolymers of EPDM type do not fall under the preceding definition and may especially be described as "essentially saturated" diene elastomers (low or very low content of units of diene origin, always less than 15%). In the "essentially unsaturated" diene elastomer category, the expression "highly unsaturated" diene elastomer is understood in particular to mean a diene elastomer having a content of units of diene origin (conjugated dienes) that is greater than 50%.

Having given these definitions, it will be understood more particularly that a diene elastomer capable of being used in the tread compositions according to the invention means:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with an unconjugated diene monomer having from 6 to 12 carbon atoms, such as, for example, the elastomers obtained from ethylene and propylene with an unconjugated diene monomer of the abovementioned type, such as, in particular, 1,4-hexadiene, ethylidene norbornene or dicyclopentadiene;

(d)—a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the type (a) or (b) above.

Suitable conjugated dienes are in particular 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. Suitable vinylaromatic compounds are, for example, styrene, ortho-, meta- or para-methylstyrene, the "vinyltoluene" commercial mixture, para-tertiobutylstyrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units. The elastomers may have any microstructure which depends on the polymerization conditions used, in particular on the presence or absence of a modifying and/or randomizing agent and on the amounts of modifying and/or randomizing agent employed. The elastomers may, for example, be block, random, sequential or microsequential elastomers and may be prepared in dispersion or in solution; they may be coupled and/or star-branched or else functionalized with a coupling and/or star-branching or functionalizing agent. For coupling with carbon black, mention may be made, for example, of functional groups comprising a C—Sn bond or of aminated functional groups, such as amino-benzophenone, for example. For coupling with a reinforcing inorganic filler such as silica, mention may be made, for example, of silanol functional groups or silanol-terminated polysiloxane functional groups (as described for example in FR 2 740 778, U.S. Pat. No. 6,013,718 and WO 2008/141702), alkoxysilane groups (as described for example in FR 2 765 882 or U.S. Pat. No. 5,977,238), carboxylic groups (as described for example in WO 01/92402 or U.S. Pat. No. 6,815,473, WO 2004/096865 or US 2006/0089445) or else polyether groups (as described for example in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type.

These functionalized elastomers may be used as a blend with one another or with unfunctionalized elastomers. For example, it is possible to use a silanol functionalized elastomer or silanol-terminated polysiloxane functionalized elastomer, as a mixture with an elastomer coupled and/or star-branched with tin (described in WO 11/042507), the latter representing a content of 5% to 50%, for example of 25% to 50%.

Polybutadienes are suitable and in particular those having a content (mol %) of 1,2-units of between 4% and 80% or those having a content (mol %) of cis-1,4- of greater than 80%, polyisoprenes, butadiene-styrene copolymers and in particular those having a Tg (glass transition temperature (Tg), measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene-isoprene copolymers and in particular those having an isoprene content of between 5% and 90% by weight and a Tg of −40° C. to −80° C., or isoprene-styrene copolymers and in particular those having a styrene content of between 5% and 50% by weight and a Tg of between −5° C. and −60° C. In the case of butadiene-styrene-isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene-styrene-isoprene copolymer having a Tg of between −20° C. and −70° C., are suitable in particular.

To summarize, the diene elastomer of the composition is preferably selected from the group of highly unsaturated diene elastomers consisting of polybutadienes (abbreviated to "BR"), synthetic polyisoprenes (IR), natural rubber (NR), butadiene copolymers, isoprene copolymers and mixtures of these elastomers. Such copolymers are more preferably selected from the group consisting of butadiene-styrene copolymers (SBR), isoprene-butadiene copolymers (BIR), isoprene-styrene copolymers (SIR), isoprene-butadiene-styrene copolymers (SBIR), butadiene-acrylonitrile copolymers (NBR), butadiene-styrene-acrylonitrile copolymers (NSBR) or a mixture of two or more of these compounds.

According to one particular embodiment, the composition comprises from 50 to 100 phr of an SBR elastomer, whether it is an SBR prepared in emulsion ("ESBR") or an SBR prepared in solution ("SSBR").

According to another particular embodiment, the diene elastomer is an SBR/BR blend (mixture).

According to other possible embodiments, the diene elastomer is an SBR/NR (or SBR/IR), BR/NR (or BR/IR), or else SBR/BR/NR (or SBR/BR/IR) blend.

In the case of an SBR (ESBR or SSBR) elastomer, use is made in particular of an SBR having a moderate styrene content, for example of between 20% and 35% by weight, or a high styrene content, for example of 35% to 45%, a content of vinyl bonds of the butadiene part of between 15% and 70%, a content (mol %) of trans-1,4-bonds of between 15% and 75% and a Tg of between −10° C. and −55° C.; such an SBR may advantageously be used as a mixture with a BR preferably having more than 90% (mol %) of cis-1,4-bonds.

In the case of an NBR elastomer, use is made in particular of an NBR having an acrylonitrile content of between 15% and 40% by weight, a content of vinyl bonds of the butadiene part of between 15% and 70% and a content (mol %) of trans-1,4-bonds of between 15% and 75%.

According to one preferred embodiment of the invention, the rubber composition comprises a blend of a (one or more) "high Tg" diene elastomer having a Tg between −70° C. and 0° C. and of a (one or more) "low Tg" diene elastomer having a Tg between −110° C. and −80° C., more preferably between −105° C. and −90° C. The high Tg elastomer is preferably selected from the group consisting of S-SBRs, E-SBRs, natural rubber, synthetic polyisoprenes (having a content (mol %) of cis-1,4-linkages preferably greater than 95%), BIRs, SIRs, SBIRs, and mixtures of these elastomers. The low Tg elastomer preferably comprises butadiene units in a content (mol %) at least equal to 70%; it preferably consists of a polybutadiene (BR) having a content (mol %) of cis-1,4-linkages greater than 90%.

According to another particular embodiment of the invention, the rubber composition comprises, for example, between 30 and 90 phr, in particular between 40 and 90 phr, of a high Tg elastomer as a blend with a low Tg elastomer.

According to another particular embodiment of the invention, the diene elastomer of the composition according to the invention comprises a blend of a BR (as low Tg elastomer)

having a content (mol %) of cis-1,4-linkages greater than 90%, with one or more S-SBRs or E-SBRs (as high Tg elastomer(s)).

I-2 Zinc Diacrylate Derivative

The tyre according to the invention is provided with a tread that comprises a composition that comprises a zinc diacrylate derivative in the form of a zinc salt of formula (I)

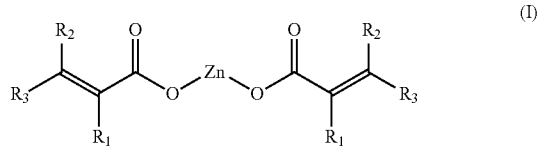

in which R1, R2 and R3 independently represent a hydrogen atom or a C1-C7 hydrocarbon group selected from linear, branched or cyclic alkyl groups, aralkyl groups, alkylaryl groups and aryl groups, which are optionally interrupted by one or more heteroatoms, R2 and R3 being able to form together a non-aromatic ring.

A cyclic alkyl group is understood to mean an alkyl group comprising one or more rings.

A hydrocarbon group or chain interrupted by one or more heteroatoms is understood to mean a group or chain comprising one or more heteroatoms, each heteroatom being between two carbon atoms of said group or chain, between a carbon atom of said group or chain and another heteroatom of said group or chain or between two other heteroatoms of said group or chain.

The heteroatom(s) may be a nitrogen, sulphur or oxygen atom.

Preferably, R1, R2 and R3 independently represent a hydrogen atom or a methyl group. More preferably, R2 and R3 each represent a hydrogen atom and according to one also very preferred alternative R1 represents a methyl group.

In the tread composition of the tyre according to the invention, the amount of zinc diacrylate derivative is preferably within a range extending from 10 to 50 phr, preferably from 20 to 30 phr. Beyond a content of 50 phr, the dispersion is worse and the properties of the composition may degrade whereas below a content of 10 phr, the effect of the zinc diacrylate derivative on the stiffening and the reinforcement is less noticeable.

By way of example, zinc diacrylate derivatives are found commercially such as the "DIMALINK 633" zinc diacrylate (ZDA) from CRAY VALLEY or the "DIMALINK 634" zinc dimethacrylate (ZDMA) from CRAY VALLEY.

I-3 Peroxide

In addition to the diene elastomer and the zinc diacrylate derivative described above, the tread composition of the tyre of the invention uses a peroxide, which may be any peroxide known to a person skilled in the art.

Among the peroxides that are well known to a person skilled in the art, it is preferable to use, for the invention, a peroxide selected from the family of organic peroxides, and in particular a peroxide selected from dicumyl peroxide, aryl or diaryl peroxides, diacetyl peroxide, benzoyl peroxide, dibenzoyl peroxide, di-tert-butyl peroxide, tert-butyl cumyl peroxide, 2,5-bis(tert-butylperoxy)-2,5-dimethylhexane, and mixtures of the latter.

Various packaged products exist commercially, known under their trademarks; mention may be made of: "Dicup" from Hercules Powder Co., "Perkadox Y12" from Noury van der Lande, "Peroximon F40" from Montecatini Edison S.p.A., "Trigonox" from Noury van der Lande, "Varox" from R.T.Vanderbilt Co., or else "Luperko" from Wallace & Tiernan, Inc.

Preferably, the amount of peroxide to be used for the requirements of the invention is less than or equal to 3 phr. Preferably, the amount of peroxide in the composition is within a range extending from 0.1 to 3 phr. Indeed, below an amount of 0.1 phr, the effect of the peroxide is not noticeable whereas above 3 phr, the elongation at break properties and therefore the strength properties of the composition are reduced. More preferably, the amount of peroxide in the composition is within a range extending from 0.2 to 2 phr, preferably from 0.25 to 1 phr.

Irrespective of the amounts of zinc diacrylate derivative and peroxide seen above, it is important for the invention that the ratio of the peroxide content to the zinc diacrylate derivative content is less than 0.09. Above such a level, the synergy between the zinc diacrylate derivative and the peroxide is not as efficient in terms of the effect on the rheometry and on the elongation at break, in particular for a composition subjected to the stresses of a tread. Preferably, the ratio of the peroxide content to the zinc diacrylate derivative content is less than or equal to 0.05, preferably less than or equal to 0.04 and more preferably less than or equal to 0.02.

I-4 Reinforcing Filler

The diene elastomer, the zinc diacrylate derivative and the peroxide are sufficient by themselves for the invention to be carried out. Nevertheless, the tread composition of the tyre according to the invention may comprise a reinforcing filler.

The physical state in which the reinforcing filler is provided is not important, whether it is in the form of a powder, of micropearls, of granules, of beads or in any other appropriate densified form.

Use may be made of any type of reinforcing filler known for its abilities to reinforce a rubber composition that can be used for the manufacture of tyres, for example an organic filler such as carbon black, a reinforcing inorganic filler such as silica, or else a blend of these two types of filler.

All carbon blacks, in particular "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the targeted applications, the blacks of higher series (for example N660, N683, N772). The carbon blacks might, for example, be already incorporated in an isoprene elastomer in the form of a masterbatch (see, for example, applications WO 97/36724 or WO 99/16600).

Mention may be made, as examples of organic fillers other than carbon blacks, of functionalized polyvinyl organic fillers as described in applications WO-A-2006/069792, WO-A-2006/069793, WO-A-2008/003434 and WO-A-2008/003435.

The composition may also contain one type of silica or a blend of several silicas. The silica used may be any reinforcing silica known to a person skilled in the art, in particular any precipitated or fumed silica having a BET surface area and a CTAB specific surface area both of less than 450 m2/g, preferably from 30 to 400 m2/g. Mention will be made, as highly dispersible precipitated silicas (referred to as HDSs), for example, of the "Ultrasil 7000" and "Ultrasil 7005" silicas from Degussa, the "Zeosil" 1165MP, 1135MP and 1115MP silicas from Rhodia, the "Hi-Sil EZ150G" silica from PPG, the "Zeopol" 8715, 8745 and 8755 silicas from Huber, treated precipitated silicas such as for example the silicas "doped" with aluminium described in application EP A 0 735 088 or the silicas with a high specific surface area as described in application WO 03/16387.

The silica preferably has a BET surface area between 45 and 400 m$^2$/g, more preferably between 60 and 300 m$^2$/g.

A person skilled in the art will understand that a reinforcing filler of another nature, in particular an organic filler, could be used as filler equivalent to the silica described in the present section, provided that this reinforcing filler is covered with a layer of silica, or else comprises, at its surface, functional sites, in particular hydroxyl sites, requiring the use of a coupling agent in order to establish the bond between the filler and the elastomer.

The volume fraction of reinforcing filler in the rubber composition is defined as being the ratio of the volume of the reinforcing filler to the volume of all of the constituents of the composition, it being understood that the volume of all of the constituents is calculated by adding the volume of each of the constituents of the composition. The volume fraction of reinforcing filler in a composition is therefore defined as the ratio of the volume of the reinforcing filler to the sum of the volumes of each of the constituents of the composition, and preferably this volume fraction is between 5% and 20%, preferably between 5% and 15%. In an equivalent preferred manner, the content of total reinforcing filler (carbon black and/or silica) is less than 50 phr, preferably from 5 to 45 phr, more preferably from 10 to 40 phr and very preferably from 15 to 35 phr.

Indeed, one advantage of the invention is that it makes it possible to reduce the content of reinforcing filler without loss of performance. Above a content of 50 phr, this advantage is no longer as great and the hysteresis of the composition increases.

Thus, preferably, the ratio of the filler content to the zinc diacrylate derivative content is within a range extending from 0.3 to 2, preferably from 0.7 to 1.3.

Preferably, the tread composition of the tyre according to the invention comprises carbon black predominantly as reinforcing filler. The predominant reinforcing filler is understood to mean the one which has the highest content among the reinforcing fillers present in the composition. In particular, the predominant reinforcing filler is understood to mean any reinforcing filler which represents at least 50% by weight of the reinforcing fillers present, preferably more than 50% and more preferably more than 60%.

These compositions may optionally also contain, in addition to the reinforcing fillers, and in particular when silica is used in the tread composition of the tyre according to the invention, coupling agents, coupling activators, agents for covering the inorganic fillers or more generally processing aids capable, in a known manner, owing to an improvement in the dispersion of the filler in the rubber matrix and to a lowering of the viscosity of the compositions, of improving their processability in the uncured state, these agents being, for example, hydrolysable silanes such as alkylalkoxysilanes, polyols, fatty acids, polyethers, primary, secondary or tertiary amines, or hydroxylated or hydrolysable polyorganosiloxanes.

As coupling agent, use is made in particular of silane polysulphides, referred to as "symmetrical" or "asymmetrical" depending on their particular structure, as described for example in applications WO 03/002648 (or US 2005/016651) and WO 03/002649 (or US 2005/016650).

Particularly suitable, without the definition below being limiting, are "symmetrical" silane polysulphides corresponding to the following general formula (III):

in which:
x is an integer from 2 to 8 (preferably from 2 to 5);
A is a divalent hydrocarbon radical (preferably $C_1$-$C_{18}$ alkylene groups or $C_6$-$C_{12}$ arylene groups, more particularly $C_1$-$C_{10}$, especially $C_1$-$C_4$, alkylenes, in particular propylene);
Z corresponds to one of the formulae below:

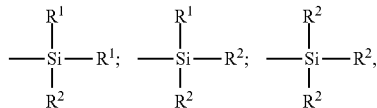

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl).

In the case of a mixture of alkoxysilane polysulphides corresponding to the above formula (II), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl) tetrasulphide, abbreviated to TESPT, of formula [($C_2H_5O$)$_3$Si($CH_2$)$_3S_2$]$_2$, or bis(triethoxysilylpropyl) disulphide, abbreviated to TESPD, of formula [($C_2H_5O$)$_3$Si($CH_2$)$_3$S]$_2$. Mention will also be made, as preferred examples, of bis(mono($C_1$-$C_4$) alkoxyldi($C_1$-$C_4$)alkylsilylpropyl) polysulphides (in particular disulphides, trisulphides or tetrasulphides), more particularly bis(monoethoxydimethylsilylpropyl) tetrasulphide, such as described in patent application WO 02/083782 (or US 2004/132880).

Mention will also be made, as examples of coupling agent other than an alkoxysilane polysulphide, of bifunctional POSs (polyorganosiloxanes), or else of hydroxysilane polysulphides ($R^2$=OH in the above formula III) as described in patent applications WO 02/30939 (or U.S. Pat. No. 6,774,255) and WO 02/31041 (or US 2004/051210), or else of silanes or POSs bearing azodicarbonyl functional groups, as described for example in patent applications WO 2006/125532, WO 2006/125533 and WO 2006/125534.

In the rubber compositions of use for the invention, the content of coupling agent is preferably between 2 and 15 phr, more preferably between 3 and 13 and more preferably still between 5 and 10 phr.

I-5 Vulcanization System

The tread composition of the tyre according to the invention does not require a vulcanization system, which is one of its advantages since this makes it possible to simplify the formula, and the preparation of the composition. If however a vulcanization system is present in the composition, it is preferably present in the small amounts explained below.

The actual vulcanization system is usually based on sulphur (or on a sulphur donor) and on a primary vulcanization accelerator. Various known secondary vulcanization accelerators or vulcanization activators, such as zinc oxide, stearic acid or equivalent compounds, or guanidine derivatives (in particular diphenylguanidine), are added to this base vulcanization system, and are incorporated during the first non-productive phase and/or during the productive phase as described below.

Molecular sulphur (or, in an equivalent manner, molecular sulphur donors), when it is used, is used in a content of preferably less than 0.5 phr, preferably less than 0.3 phr, more preferably in a content of less than 0.1 phr. Very preferably, the composition is devoid of molecular sulphur.

The vulcanization system of the composition according to the invention may also comprise one or more additional accelerators, for example compounds from the family of thiurams, zinc dithiocarbamate derivatives, sulphenamides, guanidines or thiophosphates. Use may in particular be made of any compound capable of acting as an accelerator for the vulcanization of the diene elastomers in the presence of sulphur, especially accelerators of the thiazole type and also derivatives thereof, and accelerators of the thiuram and zinc dithiocarbamate type. These accelerators are more preferably selected from the group consisting of 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert-butyl-2-benzothiazyl sulphenamide (abbreviated to "TBBS"), N-tert-butyl-2-benzothiazyl sulphenimide (abbreviated to "TBSI"), zinc dibenzyldithio-carbamate (abbreviated to "ZBEC") and mixtures of these compounds. Preferably, a primary accelerator of sulphenamide type is used.

If an accelerator is used, it is used in contents such as those used by a person skilled in the art of vulcanized compositions for tyres. Nevertheless, the tread composition of the tyre according to the invention is preferably devoid of any vulcanization accelerator.

I-6 Other Possible Additives

The tread compositions of the tyres in accordance with the invention optionally also comprise all or some of the standard additives customarily used in the elastomer compositions intended in particular for the manufacture of treads, such as for example pigments, protective agents such as antiozone waxes, chemical antiozonants and antioxidants, plasticizing agents such as those proposed below, antifatigue agents, reinforcing resins, methylene acceptors (for example phenolic novolac resin) or methylene donors (for example HMT or H3M).

According to one preferred embodiment, the tread composition of the tyre of the invention is devoid of antioxidant.

According to one preferred embodiment, the tread composition of the tyre of the invention is devoid of any plasticizing agent. Alternatively, according to one equally preferred embodiment, the composition according to the invention additionally comprises a plasticizing agent. Preferably, this plasticizing agent is a solid hydrocarbon resin (or plasticizing resin), an extender oil (or plasticizing oil), or a mixture of the two.

When it is included in the composition, the content of total plasticizing agent is preferably greater than or equal to 5 phr, more preferably from 5 to 100 phr, in particular from 10 to 80 phr, for example from 15 to 70 phr.

According to a first preferred embodiment of the invention, the plasticizer is an extender oil that is liquid at 20° C., referred to as a "low Tg" extender oil, i.e. which, by definition, has a Tg below −20° C., preferably below −40° C.

Any extender oil, whether of aromatic or non-aromatic nature, known for its plasticizing properties with respect to diene elastomers, can be used. At ambient temperature (20° C.), these oils, which are more or less viscous, are liquids (that is to say, as a reminder, substances that have the ability to eventually take on the shape of their container), as opposed, in particular, to hydrocarbon plasticizing resins which are by nature solid at ambient temperature.

Extender oils selected from the group consisting of naphthenic oils (low- or high-viscosity, in particular hydrogenated or non-hydrogenated), paraffinic oils, MES (Medium Extracted Solvate) oils, TDAE (Treated Distillate Aromatic Extract) oils, mineral oils, vegetable oils, ether plasticizers, ester plasticizers, phosphate plasticizers, sulphonate plasticizers and the mixtures of these compounds are particularly suitable. For example, mention may be made of those that contain between 12 and 30 carbon atoms, for example trioctyl phosphate. As examples of non-aqueous and water-insoluble ester plasticizers, mention may especially be made of the compounds selected from the group consisting of trimellitates, pyromellitates, phthalates, 1,2-cyclohexanedicarboxylates, adipates, azelates, sebacates, glycerol triesters and the mixtures of these compounds. Among the above triesters, mention may especially be made of glycerol triesters, preferably consisting predominantly (of more than 50%, more preferably of more than 80% by weight) of an unsaturated $C_{18}$ fatty acid, i.e. selected from the group consisting of oleic acid, linoleic acid, linolenic acid and the mixtures of these acids. More preferably, whether it is of synthetic origin or natural origin (the case for example for sunflower or rapeseed vegetable oils), the fatty acid used consists of more than 50% by weight, more preferably still more than 80% by weight, of oleic acid. Such triesters (trioleates) having a high content of oleic acid are well known; they have been described for example in application WO 02/088238 as plasticizing agents in tyre treads.

According to another preferred embodiment of the invention, this plasticizing agent is a thermoplastic hydrocarbon resin, the Tg of which is above 0° C., preferably above 20° C. This resin is a solid at ambient temperature (23° C.), as opposed to a liquid plasticizing compound such as an oil.

Preferably, the plasticizing thermoplastic hydrocarbon resin has at least any one of the following features:
- a Tg above 20° C., more preferably above 30° C.;
- a number-average molecular weight (Mn) of between 400 and 2000 g/mol, more preferably between 500 and 1500 g/mol;

a polydispersity index (PDI) of less than 3, more preferably of less than 2 (as a reminder: PDI=Mw/Mn with Mw the weight-average molecular weight).

More preferably, this plasticizing thermoplastic hydrocarbon resin has all of the preferred features above.

The macrostructure (Mw, Mn and PDI) of the hydrocarbon resin is determined by size exclusion chromatography (SEC): solvent tetrahydrofuran; temperature 35° C.; concentration 1 g/I; flow rate 1 ml/min; solution filtered through a filter with a porosity of 0.45 µm before injection; Moore calibration with polystyrene standards; set of 3 "WATERS" columns in series ("STYRAGEL" HR4E, HR1 and HR0.5); detection by differential refractometer ("WATERS 2410") and its associated operating software ("WATERS EMPOWER").

The thermoplastic hydrocarbon resins may be aliphatic or aromatic or else of aliphatic/aromatic type, i.e. based on aliphatic and/or aromatic monomers. They may be natural or synthetic, and may or may not be based on petroleum (if such is the case, they are also known under the name of petroleum resins).

The following are, for example, suitable as aromatic monomers: styrene, α-methylstyrene, ortho-, meta- or para-methylstyrene, vinyltoluene, para-tertiobutylstyrene, methoxystyrenes, chlorostyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic monomer is styrene or a vinylaromatic monomer resulting from a $C_9$ fraction (or more generally from a $C_8$ to $C_{10}$ fraction). Preferably, the vinylaromatic monomer is the minor monomer, expressed as molar fraction, in the copolymer under consideration.

According to a particularly preferred embodiment, the plasticizing hydrocarbon resin is selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, terpene/phenol homopolymer or copolymer resins, C5 fraction homopolymer or copolymer resins, C9 fraction homopolymer or copolymer resins, α-methylstyrene homopolymer and copolymer resins and the mixtures of these resins, which can be used alone or in combination with a liquid plasticizer, for example an MES or TDAE oil. The term "terpene" combines here, in a known manner, α-pinene, β-pinene and limonene monomers; use is preferably made of a limonene monomer, which compound exists, in a known manner, in the form of three possible isomers: L-limonene (laevorotatory enantiomer), D-limonene (dextrorotatory enantiomer) or else dipentene, a racemate of the dextrorotatory and laevorotatory enantiomers. Among the above plasticizing hydrocarbon resins, mention will especially be made of the α-pinene, β-pinene, dipentene or polylimonene homopolymer or copolymer resins.

The preferred resins above are well known to a person skilled in the art and are commercially available, for example sold as regards:

polylimonene resins: by DRT under the name "Dercolyte L120" (Mn=625 g/mol; Mw=1010 g/mol; PDI=1.6; Tg=72° C.) or by ARIZONA under the name "Sylvagum TR7125C" (Mn=630 g/mol; Mw=950 g/mol; PDI=1.5; Tg=70° C.);

$C_5$ fraction/vinylaromatic copolymer resins, in particular $C_5$ fraction/styrene or $C_5$ fraction/$C_9$ fraction copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100" or by Exxon under the names "Escorez 2101" and "Escorez 1273";

limonene/styrene copolymer resins: by DRT under the name "Dercolyte TS 105" from DRT or by ARIZONA Chemical Company under the names "ZT115LT" and "ZT5100".

As examples of other preferred resins, mention may also be made of phenol-modified α-methylstyrene resins. In order to characterize these phenol-modified resins, it is recalled that use is made, in a known manner, of a value known as the "hydroxyl value" (measured according to the ISO 4326 standard and expressed as mg KOH/g). The α-methylstyrene resins, in particular the phenol-modified α-methylstyrene resins, are well known to a person skilled in the art and are commercially available, for example sold by Arizona Chemical under the names "Sylvares SA 100" (Mn=660 g/mol; PDI=1.5; Tg=53° C.); "Sylvares SA 120" (Mn=1030 g/mol; PDI=1.9; Tg=64° C.); "Sylvares 540" (Mn=620 g/mol; PDI=1.3; Tg=36° C.; hydroxyl value=56 mg KOH/g); "Sylvares 600" (Mn=850 g/mol; PDI=1.4; Tg=50° C.; hydroxyl value=31 mg KOH/g).

It goes without saying that the invention relates to the tyres provided with treads comprising the rubber compositions described above both in the "uncured" or uncrosslinked state (i.e. before curing) and in the "cured" or crosslinked, or else vulcanized, state (i.e. after crosslinking or vulcanization).

II—Preparation of the Rubber Compositions

The compositions are manufactured in appropriate mixers, using two successive phases of preparation well known to a person skilled in the art: a first phase of thermomechanical working or kneading (sometimes referred to as "non-productive" phase) at high temperature, up to a maximum temperature of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system and in particular the peroxide of the compositions according to the invention is incorporated. Such phases have been described for example in applications EP-A-0501227, EP-A-0735088, EP-A-0810258, WO 00/05300 or WO 00/05301.

The first (non-productive) phase is preferably carried out in several thermomechanical steps. During a first step, the elastomers and the reinforcing fillers (and optionally the coupling agents and/or other ingredients) are introduced into an appropriate mixer, such as a standard internal mixer, at a temperature between 20° C. and 100° C. and, preferably, between 25° C. and 100° C. After a few minutes, preferably 0.5 to 2 min and a rise in the temperature to 90° C. to 100° C., the other ingredients (i.e. those that remain if not all were added at the start) are added in one go or in portions, with the exception of the crosslinking system and especially the peroxide, during a mixing that ranges from 20 seconds to a few minutes. The total duration of the kneading, in this non-productive phase, is preferably between 2 and 10 minutes at a temperature below or equal to 180° C., and preferably below or equal to 170° C.

After cooling the mixture thus obtained, the crosslinking system and especially the peroxide are incorporated at low temperature (typically below 100° C.), generally in an external mixer such as an open mill; everything is then mixed (productive phase) for a few minutes, for example between 5 and 15 min.

The final composition thus obtained is then calendered, for example in the form of a sheet or a slab, in particular for laboratory characterization, or else extruded, in order to form, for example, a rubber profiled element used for the manufacture of semi-finished articles in order to obtain products such as sidewalls, carcass ply, crown plies (or tyre belt), tread, bead wire filling, tread sublayer or other elastomer layers, preferably the tread. These products can then be used for the manufacture of tyres, according to the techniques known to a person skilled in the art.

The vulcanization (or curing) is carried out in a known manner at a temperature generally between 130° C. and 200° C., under pressure, for a sufficient time which may vary, for example, between 5 and 90 min as a function in particular of the curing temperature, of the vulcanization system used, of the vulcanization kinetics of the composition in question or else of the size of the tyre.

The examples that follow illustrate the invention without however limiting it.

III—Exemplary Embodiments of the Invention

III-1 Preparation of the Examples

In the examples that follow, the rubber compositions were produced as described above.

III-2 Characterization of the Examples

In the examples, the rubber compositions are characterized before and/or after curing as indicated below.
Dynamic Properties (after Curing): Tensile Test These tensile tests make it possible to determine the elasticity stresses and the properties at break. Unless otherwise indicated, they are carried out in accordance with the French standard NF T 46-002 of September 1988. Processing the tensile recordings also makes it possible to plot the curve of modulus as a function of elongation, the modulus used here being the nominal (or apparent) secant modulus measured in first elongation, calculated relative to the initial cross section of the test specimen. The nominal secant moduli (or apparent stresses, in MPa) are measured in first elongation at 50%, 100% and 300% elongation, identified respectively as M50, M100 and M300.

The tensile strengths (in MPa) and the elongations at break (EB in %) are measured at 23° C.±2° C., according to the standard NF T 46-002. The results are expressed "in a base 100", i.e. relative to the control to which a value 100 is attributed.

All these tensile measurements are carried out under standard temperature (23±2° C.) and hygrometry (50±5% relative humidity) conditions, according to the French standard NF T 40-101 (December 1979).

The dynamic properties G*(10%) and tan(δ)max at 40° C. are measured on a viscosity analyser (Metravib VA4000), according to the standard ASTM D 5992-96. A recording is made of the response of a sample of vulcanized composition (cylindrical test specimen with a thickness of 4 mm and a cross section of 400 mm$^2$), subjected to a simple alternating sinusoidal shear stress, at the frequency of 10 Hz, under defined temperature conditions, for example at 60° C. according to the standard ASTM D 1349-99, or depending on the case at a different temperature. A strain amplitude sweep is carried out from 0.1% to 50% (outward cycle), then from 50% to 1% (return cycle). The results utilized are the complex dynamic shear modulus G* and the loss factor tan(δ). For the return cycle, the maximum value of tan(δ) observed, identified as tan(δ)max, and also the complex dynamic shear modulus G*(10%) at 10% strain, at 60° C., are indicated.

It is recalled that, in a manner well known to a person skilled in the art, the value of tan(δ)max at 60° C. is representative of the hysteresis of the material, and therefore of the rolling resistance: the lower tan(δ)max at 60° C., the lower the rolling resistance.

III-3 Examples

III-3-1 Example I

The objective of this example is to compare the rubber properties of a control composition (T1) to compositions in accordance with the invention. The compositions tested are presented in Table 1 below.

TABLE 1

|  | T1 | C1 | C2 | C3 | C4 |
|---|---|---|---|---|---|
| BR (1) | 100 | 100 | 100 | 100 | 100 |
| ZDA derivative (2) | 20 | 20 | 20 | 20 | 20 |
| Peroxide (3) | 2 | 1.5 | 1 | 0.4 | 0.2 |
| Peroxide/ZDA derivative | 0.1 | 0.075 | 0.05 | 0.02 | 0.01 |
| Filler (4) | 3 | 3 | 3 | 3 | 3 |
| Filler/ZDA derivative | 0.15 | 0.15 | 0.15 | 0.15 | 0.15 |
| ZnO (5) | 2 | 2 | 2 | 2 | 2 |

(1) Polybutadiene comprising 98% of cis-1,4
(2) "DIMALINK 634" zinc dimethacrylate (ZDMA) from CRAY VALLEY
(3) "Dicup" dicumyl peroxide from Hercules
(4) N234 ASTM grade carbon black (Cabot)
(5) Zinc oxide (industrial grade - Umicore)

Table 2 below gives the properties measured for the various compositions.

TABLE 2

|  | T1 | C1 | C2 | C3 | C4 |
|---|---|---|---|---|---|
| EB (base 100) | 100 | 500 | 566 | 666 | 833 |

Compared to the control composition, it is noted that the compositions C1 to C4 have a greatly improved elongation at break.

III-3-2 Example II

The objective of this example is to compare the various rubber properties of control compositions (T1 to T3) to compositions in accordance with the invention. The compositions tested are presented in Table 3 below.

TABLE 3

|  | T1 | T2 | T3 | C1 | C2 | C3 |
|---|---|---|---|---|---|---|
| NR (1) | 100 | 100 | 100 | 100 | 100 | 100 |
| ZDA derivative (2) | 20 | 20 | 20 | 20 | 20 | 20 |
| Peroxide (3) | 3.5 | 3 | 2 | 1.5 | 1 | 0.75 |
| Peroxide/ZDA derivative | 0.175 | 0.15 | 0.1 | 0.075 | 0.05 | 0.037 |
| Filler (4) | 3 | 3 | 3 | 3 | 3 | 3 |

TABLE 3-continued

|  | T1 | T2 | T3 | C1 | C2 | C3 |
|---|---|---|---|---|---|---|
| Filler/ZDA derivative | 0.15 | 0.15 | 0.15 | 0.15 | 0.15 | 0.15 |
| ZnO (5) | 2 | 2 | 2 | 2 | 2 | 2 |

(1) Natural rubber
(2) "DIMALINK 634" zinc dimethacrylate (ZDMA) from CRAY VALLEY
(3) "Dicup" dicumyl peroxide from Hercules
(4) N234 ASTM grade carbon black (Cabot)
(5) Zinc oxide (industrial grade - Umicore)

Table 4 below gives the properties measured for the various compositions.

TABLE 4

|  | T1 | T2 | T3 | C1 | C2 | C3 |
|---|---|---|---|---|---|---|
| EB (base 100) | 25 | 53 | 100 | 135 | 150 | 175 |

Compared to the control compositions, it is noted that the compositions C1, C2 and C3 have a greatly improved elongation at break.

III-3-3 Example III

The objective of this example is to compare the various rubber properties of control compositions (T1 to T3) to compositions in accordance with the invention. The compositions tested are presented in Table 5 below.

The compositions C1 to C6 have stiffness levels close to a conventional control compound with a standard filler content (T1) and are much stiffer than a compound similar to the control T1 but with a low filler content (T2). It should be noted that, for a performance equivalent to conventional compounds with a standard filler content, the compositions of the invention enable a reduced, or even very greatly reduced, hysteresis. This makes it possible to manufacture tyres with a low rolling resistance while nevertheless retaining good mechanical properties. Compared relative to a base 100, it can be noted that the elongation at break of the compositions of the invention drops with respect to a conventional compound with a standard filler content, however, the degree of elongation at break in the compositions of the invention remains perfectly compatible with a use as a tyre tread. The peroxide-free composition T3 has a very low stiffness $G^*10\%$ and a very low reinforcement (M300).

The invention claimed is:

1. A tire provided with a tread, said tread comprising a rubber composition comprising:
   at least one diene elastomer;
   a zinc diacrylate derivative in the form of a zinc salt of formula (I)

TABLE 5

|  | T1 | T2 | C1 | C2 | C3 | C4 | C5 | C6 | T3 |
|---|---|---|---|---|---|---|---|---|---|
| HNBR (1) |  |  | 100 | 100 |  |  |  |  |  |
| NBR (2) |  |  |  |  | 100 | 100 |  |  |  |
| NR (3) | 100 | 100 |  |  |  |  | 100 | 100 | 100 |
| ZDA derivative (4) |  |  | 20 | 15 | 20 | 15 | 20 | 20 | 20 |
| Peroxide (5) | 1.5 | 1.5 | 1.5 | 1.5 | 1.5 | 1.5 | 1.5 | 1.5 |  |
| Peroxide/ZDA derivative |  |  | 0.075 | 0.075 | 0.075 | 0.075 | 0.075 | 0.075 | 0 |
| Filler (6) | 54 | 20 | 3 | 20 | 3 | 20 | 3 | 20 | 20 |
| Filler/ZDA derivative |  |  | 0.15 | 1.3 | 0.15 | 1.3 | 0.15 | 1 | 1 |
| ZnO (7) | 2.4 | 2.4 | 2 | 2 | 2 | 2 | 2 | 2 | 2 |
| Stearic acid (8) | 2 | 2 |  |  |  |  |  |  |  |
| Sulphur | 1.1 | 1.1 |  |  |  |  |  |  |  |
| Accelerator (9) | 1.1 | 1.1 |  |  |  |  |  |  |  |

(1) "Therban 3408" hydrogenated nitrile rubber from Lanxess, 34% acrylonitrile
(2) "NBR 3370" nitrile rubber from Lanxess, 33% acrylonitrile
(3) Plasticized natural rubber
(4) "DIMALINK 634" zinc dimethacrylate (ZDMA) from CRAY VALLEY
(5) "Dicup" dicumyl peroxide from Hercules
(6) N234 ASTM grade carbon black (Cabot)
(7) Zinc oxide (industrial grade - Umicore)
(8) Stearin ("Pristerene 4931" from Uniqema)
(9) N-cyclohexyl-2-benzothiazole sulphenamide ("Santocure CBS" from Flexsys)

Table 6 below gives the properties measured for the various compositions.

TABLE 6

|  | T1 | T2 | C1 | C2 | C3 | C4 | C5 | C6 | T3 |
|---|---|---|---|---|---|---|---|---|---|
| $G^* 10\%\ -60°$ C. | 2.25 | 0.9 | 1.92 | 2.64 | 2.18 | 2.96 | 1.14 | 1.65 | 0.2 |
| $\tan(\delta)_{max}\ 60°$ C. | 0.2 | 0.09 | 0.17 | 0.21 | 0.11 | 0.15 | 0.04 | 0.07 | 0.16 |
| M300 | 3.17 | 1.13 | 2.21 | 3.08 | / | / | 2.53 | 4.56 | 0.5 |
| EB | 100 | 121 | 82 | 100 | 50 | 51 | 88 | 86 | 78 |

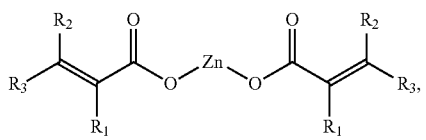 (I)

wherein R1, R2 and R3 independently represent a hydrogen atom or a C1-C7 hydrocarbon group selected from linear, branched or cyclic alkyl groups, aralkyl groups, alkylaryl groups and aryl groups, which are optionally interrupted by one or more heteroatoms, R2 and R3 being able to form together a non-aromatic ring; and
a peroxide,
wherein a ratio of the peroxide content to the zinc diacrylate derivative content is from more than 0 to 0.09,
wherein the rubber composition comprises from 5 to 45 phr of a reinforcing filler, and
wherein a ratio of the reinforcing filler content to the zinc diacrylate derivative content is within a range extending from 0.7 to 1.3.

2. The tire according to claim 1, wherein the rubber composition comprises no reinforcing filler.

3. The tire according to claim 1, wherein R1, R2 and R3 independently represent a hydrogen atom or a methyl group.

4. The tire according to claim 1, wherein R2 and R3 each represent a hydrogen atom.

5. The tire according to claim 1, wherein R1 represents a methyl group.

6. The tire according to claim 1, wherein the zinc diacrylate derivative content is within a range extending from 10 to 50 phr.

7. The tire according to claim 6, wherein the zinc diacrylate derivative content is within a range extending from 20 to 30 phr.

8. The tire according to claim 1, wherein the peroxide is an organic peroxide.

9. The tire according to claim 1, wherein the peroxide content is from more than 0 to 3 phr.

10. The tire according to claim 1, wherein the peroxide content is within a range extending from 0.1 to 3 phr.

11. The tire according to claim 1, wherein the peroxide content is within a range extending from 0.2 to 2 phr.

12. The tire according to claim 11, wherein the peroxide content is within a range extending from 0.25 to 1 phr.

13. The tire according to claim 1, wherein the ratio of the peroxide content to the zinc diacrylate derivative content is from more than 0 to 0.05.

14. The tire according to claim 13, wherein the ratio of the peroxide content to the zinc diacrylate derivative content is from more than 0 to 0.04.

15. The tire according to claim 14, wherein the ratio of the peroxide content to the zinc diacrylate derivative content is from more than 0 to 0.02.

16. The tire according to claim 1, wherein the diene elastomer is selected from the group consisting of polybutadienes, synthetic polyisoprenes, natural rubber, butadiene copolymers, isoprene copolymers and mixtures thereof.

17. The tire according to claim 16, wherein the diene elastomer is selected from the group consisting of polybutadienes, synthetic polyisoprenes, natural rubber, copolymers of butadiene and styrene, copolymers of butadiene and acrylonitrile, copolymers of isoprene and styrene and mixtures thereof.

18. The tire according to claim 1, wherein the reinforcing filler content is within a range extending from 10 to 40 phr.

19. The tire according to claim 18, wherein the reinforcing filler content is within a range extending from 15 to 35 phr.

20. The tire according to claim 1, wherein the reinforcing filler is carbon black, silica or a mixture of carbon black and silica.

21. The tire according to claim 20, wherein the reinforcing filler predominantly consists of carbon black.

22. The tire according to claim 1, wherein the rubber composition contains from 0 to less than 0.5 phr molecular sulphur or sulphur donor as vulcanizing agent.

23. The tire according to claim 22, wherein the rubber composition contains from 0 to less than 0.3 phr molecular sulphur or sulphur donor as vulcanizing agent.

24. The tire according to claim 23, wherein the rubber composition contains from 0 to less than 0.1 phr molecular sulphur or sulphur donor as vulcanizing agent.

25. The tire according to claim 24, wherein the rubber composition contains no molecular sulphur or sulphur donor as vulcanizing agent.

26. The tire according to claim 1, wherein the rubber composition contains no vulcanization accelerator.

27. The tire according to claim 1, wherein the rubber composition contains no antioxidant.

28. The tire according to claim 1, wherein the rubber composition additionally comprises a plasticizer.

29. The tire according to claim 28, wherein the plasticizer is selected from the group consisting of plasticizing resins, extender oils and mixtures thereof.

* * * * *